(12) United States Patent
Wallace

(10) Patent No.: US 9,676,553 B2
(45) Date of Patent: Jun. 13, 2017

(54) CONVEYOR ROLLER WITH INTEGRAL CLUTCH

(71) Applicant: Matthew Earl Wallace, West Olive, MI (US)

(72) Inventor: Matthew Earl Wallace, West Olive, MI (US)

( * ) Notice: Subject to any disclaimer, the term of this patent is extended or adjusted under 35 U.S.C. 154(b) by 30 days.

(21) Appl. No.: 14/477,475

(22) Filed: Sep. 4, 2014

(65) Prior Publication Data

US 2015/0068873 A1    Mar. 12, 2015

Related U.S. Application Data

(60) Provisional application No. 61/874,559, filed on Sep. 6, 2013.

(51) Int. Cl.
*B65G 13/07* (2006.01)
*B65G 13/06* (2006.01)
*B65G 13/02* (2006.01)
*B65G 13/073* (2006.01)

(52) U.S. Cl.
CPC ........... *B65G 13/073* (2013.01); *B65G 13/07* (2013.01)

(58) Field of Classification Search
None
See application file for complete search history.

(56) References Cited

U.S. PATENT DOCUMENTS

| | | | |
|---|---|---|---|
| 2,808,623 A * | 10/1957 | Foster | B29C 39/00 264/327 |
| 3,853,315 A * | 12/1974 | Dahlgren | B41F 13/36 271/204 |
| 4,221,288 A | 9/1980 | Rae | |
| 4,266,659 A | 5/1981 | Meyere et al. | |
| 4,286,441 A | 9/1981 | Scheneman, Jr. et al. | |
| 4,314,629 A | 2/1982 | Shilander et al. | |
| 4,343,396 A | 8/1982 | George | |
| 4,372,441 A * | 2/1983 | Krammer | B65G 47/261 198/781.06 |
| 4,421,224 A | 12/1983 | Dingman | |
| 4,524,861 A | 6/1985 | Matsushita | |
| 4,836,358 A * | 6/1989 | Fauth, Sr. | B65G 13/06 198/789 |
| 5,012,920 A | 5/1991 | Wakefield | |
| 5,088,596 A * | 2/1992 | Agnoff | B65G 13/073 198/788 |
| 5,147,024 A | 9/1992 | Yamada | |
| 5,287,977 A * | 2/1994 | Tirschler | B65G 13/07 198/789 |
| 5,810,157 A | 9/1998 | Nolan | |
| 6,644,459 B2 | 11/2003 | Leeuwen et al. | |

(Continued)

FOREIGN PATENT DOCUMENTS

DE    2117959    9/1972
DE    3222936    12/1983

(Continued)

*Primary Examiner* — Kavel Singh
(74) *Attorney, Agent, or Firm* — Craig A. Phillips; Dickinson Wright PLLC

(57) ABSTRACT

A material handling system have the ability for the rollers to slip relative to the drive system, such as a roller bed conveyor used an accumulator conveyor system. The rollers include a slip assembly with a clutch surface, wherein the tube of the roller is configured to act as a heat sink.

37 Claims, 8 Drawing Sheets

(56) References Cited

U.S. PATENT DOCUMENTS

| | | | |
|---|---|---|---|
| 6,772,874 B2 * | 8/2004 | Yamashita | B65G 47/263 198/781.02 |
| 6,782,996 B1 | 8/2004 | Wolf | |
| 6,820,736 B2 | 11/2004 | Itoh et al. | |
| 6,868,961 B2 | 3/2005 | Ehlert et al. | |
| 7,021,456 B2 | 4/2006 | Haan et al. | |
| 7,290,649 B2 | 11/2007 | Wolkerstorfer | |
| 7,329,215 B2 * | 2/2008 | Umeda | B65G 23/08 198/788 |
| 7,503,450 B2 | 3/2009 | Helgerson et al. | |
| 7,823,719 B2 | 11/2010 | Jaksic et al. | |

FOREIGN PATENT DOCUMENTS

| | | |
|---|---|---|
| DE | 3709512 | 10/1987 |
| DE | 3720609 | 1/1989 |
| DE | 4201499 | 12/1992 |
| DE | 4135565 | 5/1993 |
| DE | 4238294 | 5/1994 |
| DE | 102005020179 | 11/2006 |
| DE | 202006006106 | 8/2007 |
| EP | 0291105 | 11/1988 |
| EP | 0372854 | 6/1990 |
| EP | 1717168 | 11/2006 |
| FR | 1418208 | 11/1965 |
| GB | 964311 | 7/1964 |
| WO | 03106305 | 12/2003 |
| WO | 2013060502 | 5/2013 |

* cited by examiner

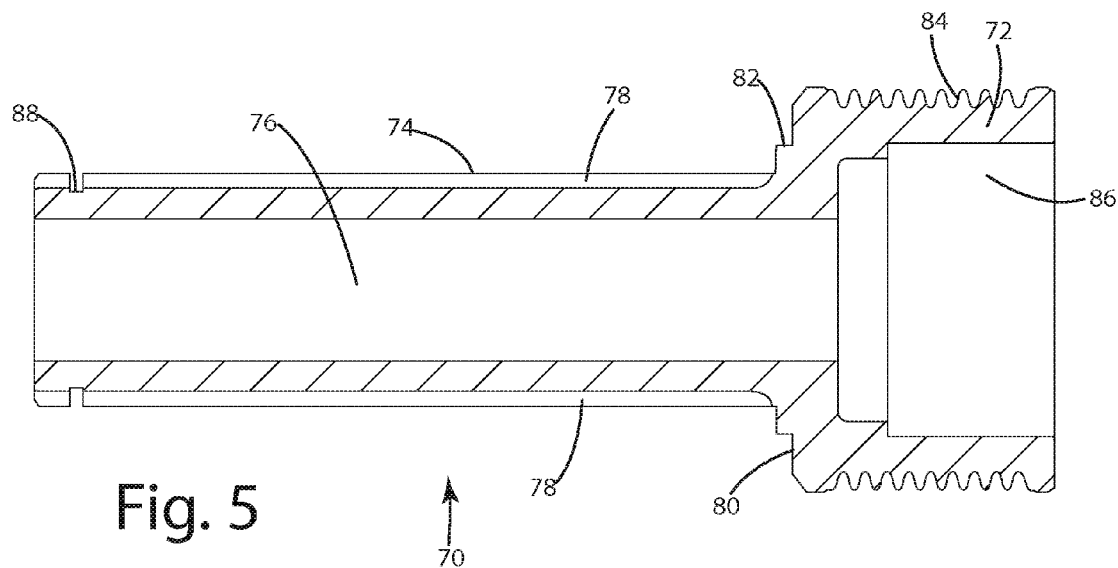
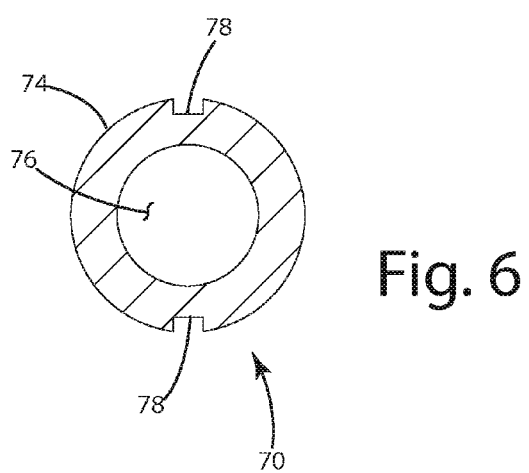
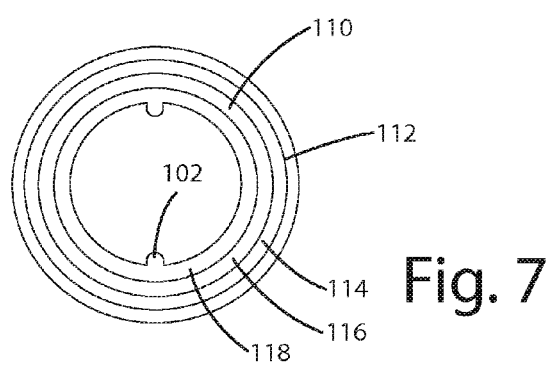

CONVEYOR ROLLER WITH INTEGRAL CLUTCH

CROSS-REFERENCE TO RELATED APPLICATIONS

This U.S. Patent Application claims the benefit of U.S. Provisional Patent Application Ser. No. 61/874,559 filed Sep. 6, 2013 entitled "Conveyor Roller With Integral Clutch," the entire disclosure of the application being considered part of the disclosure of this application, and hereby incorporated by reference.

BACKGROUND OF THE INVENTION

1. Technical Field

The present invention generally relates to a material handling system and more particularly, to a roller bed conveyor, such as an accumulator conveyor system, wherein limited and controlled slip between the roller surface and drive system is desired.

2. Related Art

Roller conveyors are commonly found in a variety of manufacturing, distribution and other warehouse facilities. Most roller conveyor systems include a variety of straight and curved segments configured to allow products, individually or packaged together, to travel through a facility, past various operations and to various destinations. Roller conveyor systems may also be an accumulation conveyor system, configured to allow live storage of products or accumulation of loads on the conveyor system. Accumulator conveyors are configured to stop and start various segments or portions of segments as needed and to allow packages or loads to selectively accumulate or be conveyed to a destination. Many accumulator conveyors are used in warehouse or distribution centers where accumulator conveyor segments feed onto a main line, with each accumulator conveyor segment feeding the main line with a single product. A control system may control the timing of each accumulator conveyor segment feeding the main line so that all products or packages going to a particular destination are clearly delineated and ready for shipment as a group. Therefore, as an order for a variety of products is placed in the system and then prepared for shipment, each of the accumulator conveyors feeds the desired amount of product onto the main line and the main conveyor line conveys the products or loads to a shipping point where as a group they are packaged together, such as on a pallet or in a box, and shipped out together. An example of an accumulator system would be a system in a beverage distribution facility with a multitude of individual beverage products, such as cases of cans, bottles, or even totes of two liters, which feed onto a main line where they are packaged together to a final destination point. As the order is processed, particular beverages from individual conveyor segments are fed onto the main line and timed such that as the order passes down the main line, additional products for that order are fed onto the main line, creating a grouping of loads on the main line for a single destination.

With heavier loads such as beverages, which have a high weight in a small space, traditional accumulator lines that use a single start and stop mechanism are expensive, difficult to properly operate and have problematic operational considerations due to the dense packing of heavy loads on most accumulator conveyor systems. More specifically, a long row of heavy loads, such as beverages, when tightly packed that must be stopped and started over and over, sometimes moving precisely only a single load forward or onto an intersecting or main conveyor segment, requires substantial force to start and stop and the start and stop mechanisms must be robustly built to take a lifetime of stops and starts without breakdown, which results in expensive mechanisms. As such, it would be desirable to space the loads sufficiently apart; however, in many accumulator conveyor systems, the loads are packed as tightly as possible to maximize live storage on the conveyor system, which creates operational difficulties in efficiently and consistently stopping and starting in a reliable manner. Therefore, when the conveyor starts, for densely packed loads, the motor must drive a large segment such as a 20 foot segment of a roller bed feeding power to each roller and moving the 20 foot segment of product or loads forward in unison. This can be extremely hard on the motor as well as the drive connection between the rollers and motor, particularly when the loads are densely packed on the system without gaps, and are a heavy dense material, such as beverages, laundry detergent, and metal hardware.

In addition, accumulator conveyor systems are generally price-sensitive and the addition of cost to any one area generally must be offset by a reduction in price on other parts of the conveyor system. Therefore, it is difficult to use more expensive rollers or drive systems, to offset the extreme wear caused by the heavy densely packed loads. While some manufacturers have proposed expensive clutches attached to the motor, in addition to problems with price sensitivity, these clutches have particular problems with starting and stopping the motor, such as for heavier loads excessive wear and tear which may cause shortened life expectancy, or may require more robust clutch systems that are substantially more expensive. In addition, the motor, even if a clutch is used to protect the drive system between the clutch and each roller, may experience wear. While some manufacturers have attempted to clutch individual rollers for larger pallet conveyor systems, these clutched rollers are extremely large and to date have been too expensive and too large to be practical in most settings other than pallet conveyors. As such, not only has the cost, but also their size prevented them from being used in most package and beverage conveyor systems. In addition, for most roller conveyors that are not pallet conveyors, the slip must be a very light pressure, no more than needed to drive forward the expected load on each roller. For example, a load that is less than thirty pounds may need only 0.5-5 lbs. and for beverages 3-5 lbs. of total force to start the load in motion and then drive the load forward. When the load is spread across multiple rollers, the maximum force applied by each roller may be very small, typically dividing the total force by the number of supporting rollers. For example, if the load spans two or three rollers, a load requiring 3-5 lbs. of force, each roller should have no more than about 1-2 lbs of torque, typically less, of forward pressure applied by each roller to the load. Any higher forward pressure and the system will not allow for controlled slip situations, and may damage the system or loads. More specifically, if there is a fifty foot accumulator conveyor, which many accumulator conveyor systems include even longer runs, and each roller applies a 1-2 pound pressure and there are one hundred total rollers, the pressure applied in a no gap between loads configuration may easily be 100-200 pounds of force against the mechanism, such as a gate, that controls releasing the next load from the run to another segment. To date no system efficiently and in a reliable manner applies a light enough load for under fifty pound packages or loads on the system when the clutch system is coupled to or within each roller. More specifically, a light load applied by each roller has been difficult to consistently achieve with each roller applying less than 5 lbs. on average, preferably less than 2 lbs., and in many instances well under a pound of force, before slip occurs within the roller and not between the roller and the load. In addition, current clutches attached to each roller are not cost effective when compared to single clutch systems, which include the above identified problems.

SUMMARY OF THE INVENTION

The present invention relates to roller conveyor system, particularly an accumulator roller bed conveyor system that provides a cost-effective, efficient, and reliable system for providing a slippable roller that easily and efficiently transfers drive from drive mechanisms such as motorized rollers to adjacent rollers that include a slip mechanism. The present invention is particularly useful with accumulator systems that maintain positive pressure against a gate or a stop start roller.

The present invention is directed to a roller for a roller bed conveyor system, the roller includes an elongated tube having an axis and being configured to rotate about the axis and a slip assembly coupled to the elongated tube. The slip assembly includes a drive shaft having an elongated shaft and wherein the elongated shaft includes a first anti-rotation key; a heat sink interface between the elongated tube and the driveshaft and wherein the heat sink interface and the drive shaft are configured to selectively rotate relative to each other; a thrust washer located between the drive shaft and the heat sink interface; and a compliance device located between the thrust washer and the drive shaft.

The driveshaft may include an integral pulley, and the pulley is located proximate to the end of the elongated shaft. In the instance where the driveshaft includes the integral pulley, the pulley is located proximate to an end of the elongated shaft. The driveshaft may include an axle cavity which may further include a main bearing seat recess configured to receive a main bearing. An axle shaft may be configured to extend through the elongated tube and the driveshaft and the drive shaft may be at least partially supported on the axle shaft by the main bearing. A shaft spring may engage the slip assembly and the axle, and may be configured such that the shaft spring biases the axle relative to the slip assembly. The axle may be further configured to be moveable relative to the slip assembly and the elongated tube along the axis about which the pulley and elongated tube rotate.

The thrust washer may include a second anti-rotation key and wherein the first and second anti-rotation keys prevent the thrust washer from moving radially about the axis relative to the driveshaft.

The thrust washer includes a first contoured surface configured to engage the heat sink interface. In addition, the thrust washer includes a compliance surface configured to engage the compliance device, which is preferably flat. The first contoured surface may include a clutch surface configured to engage the heat sink interface. The first contoured surface may further include a second clutch surface. The first contoured surface may further include a clutch surface radially disposed about the axis. More specifically, the first contoured surface may further include an inner recess between the axis and the clutch surface, an outer ridge and an outer recess between the outer ridge and the clutch surface. While it is expected that the clutch surface has a greater height from the base of the outer recess than the outer ridge, such that the clutch surface protrudes the most from the contoured surface, other configurations may exist so long as the heat sink interface and the thrust washer in the area of the clutch surface engage first.

The compliance device is configured to provide consistent engagement between the thrust washer and the heat sink interface while compensating for manufacturing tolerance variations and tolerance variations due to force applied to the elongated tube. More specifically these tolerance variations may be reduced or substantially eliminated through the compliance device, such that each roller applies a desired force to the load, and slips at the desired amount of force, which also may be specifically adjusted between rollers, as desired.

The compliance device is generally selected from the group consisting of at least one coil spring, an elastomer, a wave washer, and a bladder. As illustrated in the drawings, the compliance device is a wave washer. The heat sink includes an elongated sleeve, an outer shoulder and a radially inward extending portion. The radially inward extending portion includes a contoured clutch surface. The contoured clutch surface may include a friction surface and a ridge. The contoured clutch surface includes at least two separate friction surfaces configured to engage a slip face of the thrust washer. The thrust washer further includes an outer ridge, an outer recess, a first clutch surface, and an inner recess. In addition, the thrust washer may include a second clutch surface, or even more additional clutch surfaces.

The outer ridge of the thrust washer generally fits within the outer recess of the contoured clutch surface of the heat sink interface, and the ridge on the contoured clutch surface fits within the outer recess on the thrust washer. More specifically, the outer ridge of the thrust washer is spaced apart from the outer recess of the contoured clutch surface of the heat sink interface, and the ridge on the contoured clutch surface may be spaced apart from the outer recess on the thrust washer. In addition, the outer shoulder and the radially inward extending portion define a cavity for receiving the thrust washer.

A retaining ring may be secured to the elongated shaft proximate to an end and a spring between the heat sink and the retaining ring. The heat sink interface may include at least one driveshaft bearing configured to allow the driveshaft to rotate relative to the heat sink and wherein the spring is located between the retaining ring and the shield washer and wherein the spring is configured to apply force to the driveshaft bearing through the shield washer.

A shield washer may be included, which includes an outwardly extending portion and a collar extending therefrom along the inner edge of the shield washer. Each of the at least one driveshaft bearings has an inner member configured to engage the driveshaft and an outer member configured to engage the heat sink interface, and wherein the collar is configured to engage one of the at least one driveshaft bearings and only apply pressure to the inner member of the driveshaft bearing.

In operation, the spring and the compliance device generally apply substantially equal opposing forces, such as within at least twenty percent, preferably 15%, more preferably 10% and most preferably 5% (at least before installation); however, the more equal the compliance device and spring are, the better operation of the device. In addition, the spring and compliance device when installed are generally expected to apply almost equal force, as they generally will balance the forces, by one being a little more compressed and the being a little more extended, such that in reality they apply equal forces once installed.

The thrust washer is formed from acetyl.

DESCRIPTION OF THE FIGURES

FIG. 5 is a cross sectional view of the drive shaft along lines 5-5 in FIG. 4.

FIG. 6 is a cross sectional view of the drive shaft along lines 6-6 in FIG. 4.

FIG. 7 is a plan view of the slip face of the thrust washer.

DETAILED DESCRIPTION OF THE PREFERRED EMBODIMENT

Figure 10:
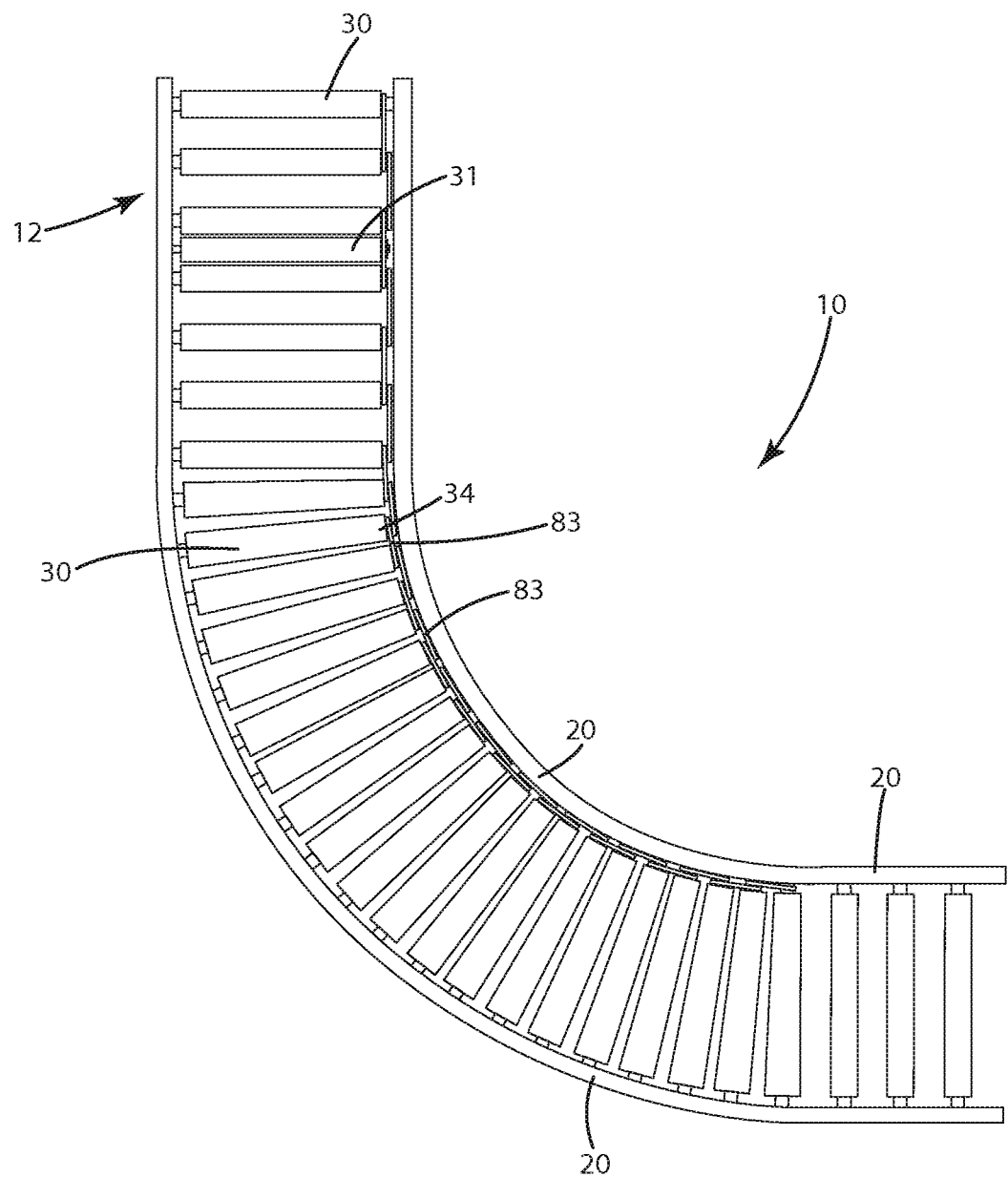
FIG. 10 is an exemplary roller bed conveyor system in which the rollers of the present invention may be used.
Figure 11:
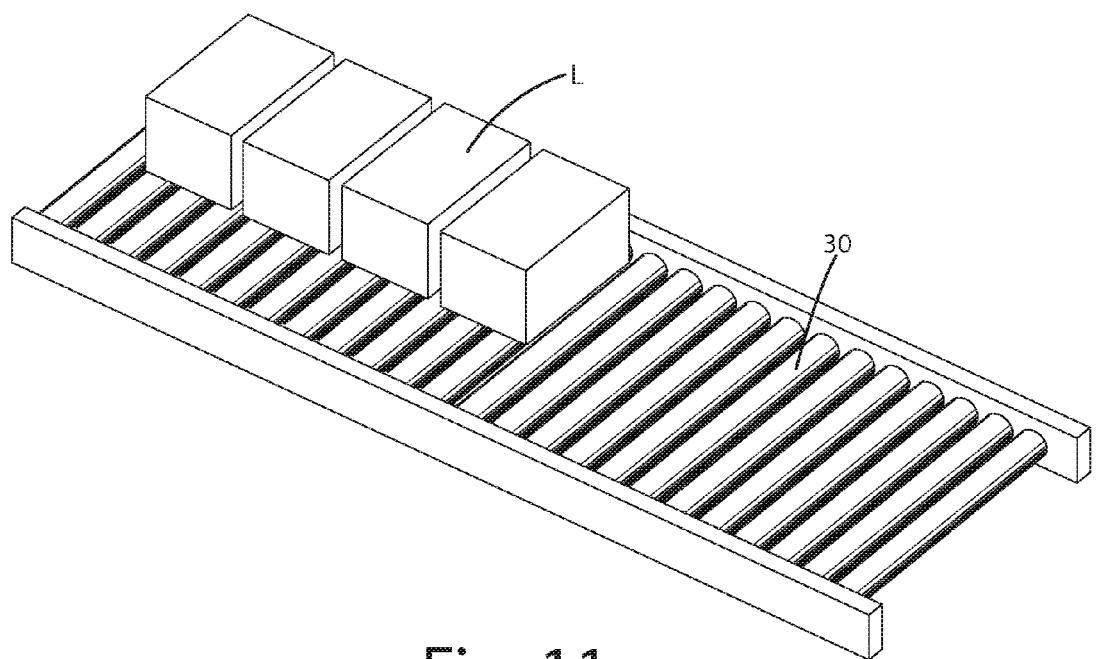
FIG. 11 is an exemplary rollerbed including loads.

As illustrated in FIGS. 10 and 11, the present invention generally includes a roller bed conveyor system 10, typically for use with an accumulator conveyor. The conveyor system 10 of the present invention may be made in practically any desired configuration by combining straight segments, curved segments, intersections, ramped sections, and any other desirable segments in a variety of configurations with a variety of operational components, such as sorters, accumulators, transfers and/or diverters, as desired by the needs of the user. Accumulator conveyors are particularly useful when individual runs having a single product feed onto a main run in controlled fashion to allow automated sorting of a variety of products into a single order or destination. Each run may be made up of one or more desired segments. A single order may include a number of items going to the same destination, or same route or same truck, wherein the items may differ. For example, an order having forty total items may have six products in various quantities. Instead of manually picking the number of items for each product and placing them on a conveyor system to be later sorted to the desired destination from other loads to other destinations, the accumulator system 10 allows tracking of the position of the main conveyor segment and releases loads or products from various adjacent accumulator conveyors in the desired quantities automatically, onto the main conveyor segment such that the loads to a particular destination are all in one group on the main segment, when they reach the end of the main segment. Keeping such loads in a single group reduces errors and labor in sorting the products and loads for shipping.

In the present invention, the conveyor system 10 is specifically configured to transfer power from a drive system, such as a powered roller 31 illustrated in FIG. 10, and set under the roller bed with belts being interconnected with the individual pulleys on each roller 30. It should be recognized that the drive system may be any desired drive system that transfers drive power to the rollers 30 to cause them to rotate. As illustrated in the Figures, a plurality of belts transfer drive from a powered roller 31, although other configurations to drive the individual rollers 30 may be used. When used with an accumulator conveyor 10, the drive system is configured such that the rollers 30 when combined with the slip mechanism 60 of the present invention allow for easy stops and starts. As illustrated in FIG. 11, a power roller 31 is typically placed under the load bearing rollers 30 of the roller bed or outside an accumulation zone, although as stated above, any other drive source may be used. More specifically, the present invention allows the roller bed conveyor system 10 to be driven directly by a drive system while minimizing slip of the belts 83 on the pulleys or other undesirable results from jam situations, including excessive force applied by the combined loads. As such, the present invention minimizes or prevents slipping of the belts 83 on the pulleys, and the drive belt (not illustrated) from the drive roller 31 while allowing the load surface, such as the elongated tube 32 of the roller 30, to slip in a controlled and desired manner relative to the pulley 72. Therefore, if slip occurs, instead of the belts 83, pulleys 72, or the drive mechanism, such as the power roller 31, being damaged when slip occurs, or the roller 30 slipping against the loads, the present invention uses a slip drive assembly 60 coupled to the elongated tube of each roller 30 to provide consistent, controlled and desirable slip.

Each roller 30 includes an elongated tube 32 which is configured to rotate under load in unison with the pulleys, under normal operating conditions, but in certain circumstances, the slip drive assembly 60 allows rotation of the pulley 72 (within certain operating parameters), independently of the tube 32 such as when certain load conditions are exceeded. Load conditions may be exceeded in jam conditions, failed release mechanisms on accumulator conveyors, as well as a variety of other situations. In fact, the present invention provides a cost efficient, easily replaceable slip system that allows the drive system, such as the power roller 31 to operate continuously with the gate solely deciding when to release loads to avoid the extra power of startup operation from a stopped position, which reduces wear on the power roller 31. The slip drive assembly 60 does not rotate freely relative to the elongated tube 32 but instead the pulley 72 is configured to have limited slip relative to the elongated tube 32 such that torque is provided by the pulley to the surface of the elongated tube 32 to convey the load along the roller bed, but when that desired torque is exceeded, the elongated tube 32 is configured to not rotate in unison with the pulley 72 and may even allow the tube 32 to come to a stop for substantial time periods while the pulley continues to rotate, without any damage to the drive system, belts, pulley or even the slip mechanism 60 occurring.

Figure 1:
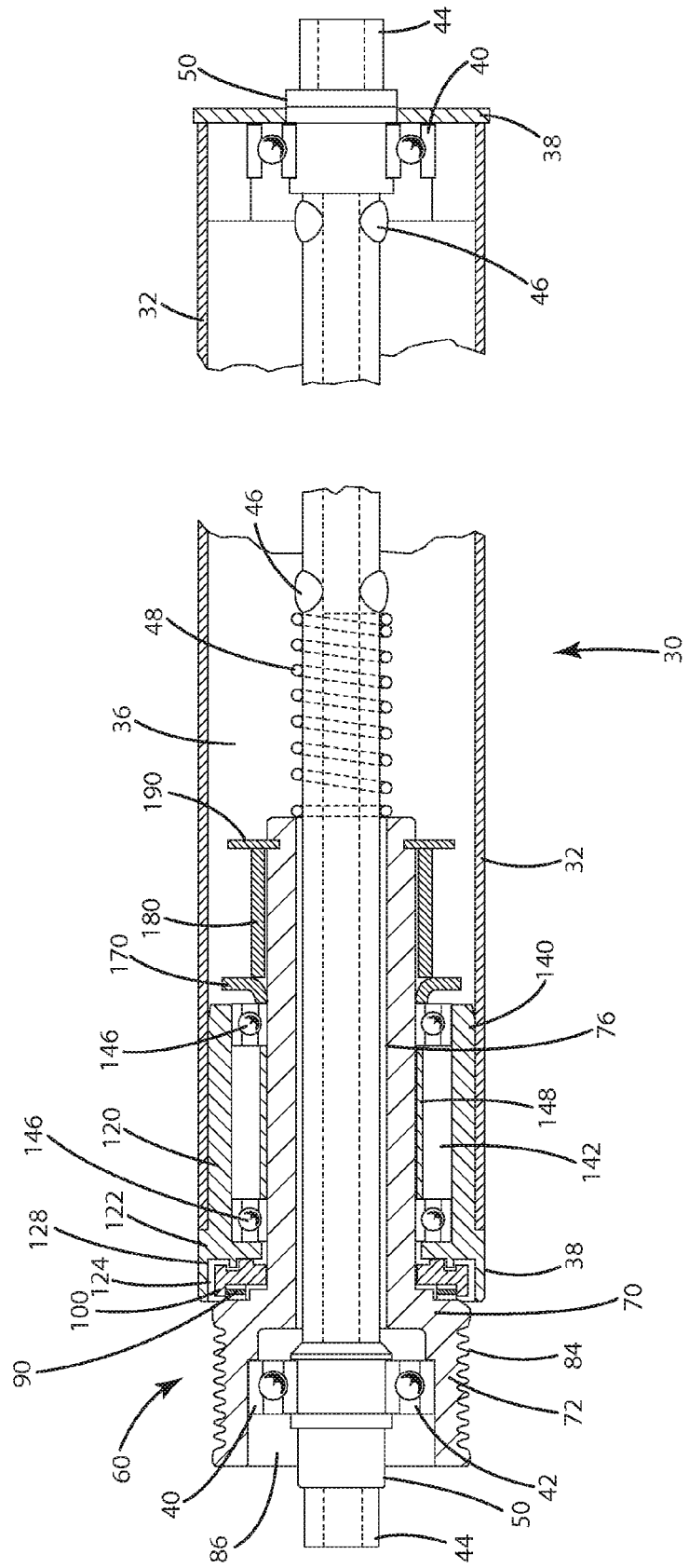
FIG. 1 is a partial cross sectional view of a roller including a slip assembly of the present invention.
Figure 2:
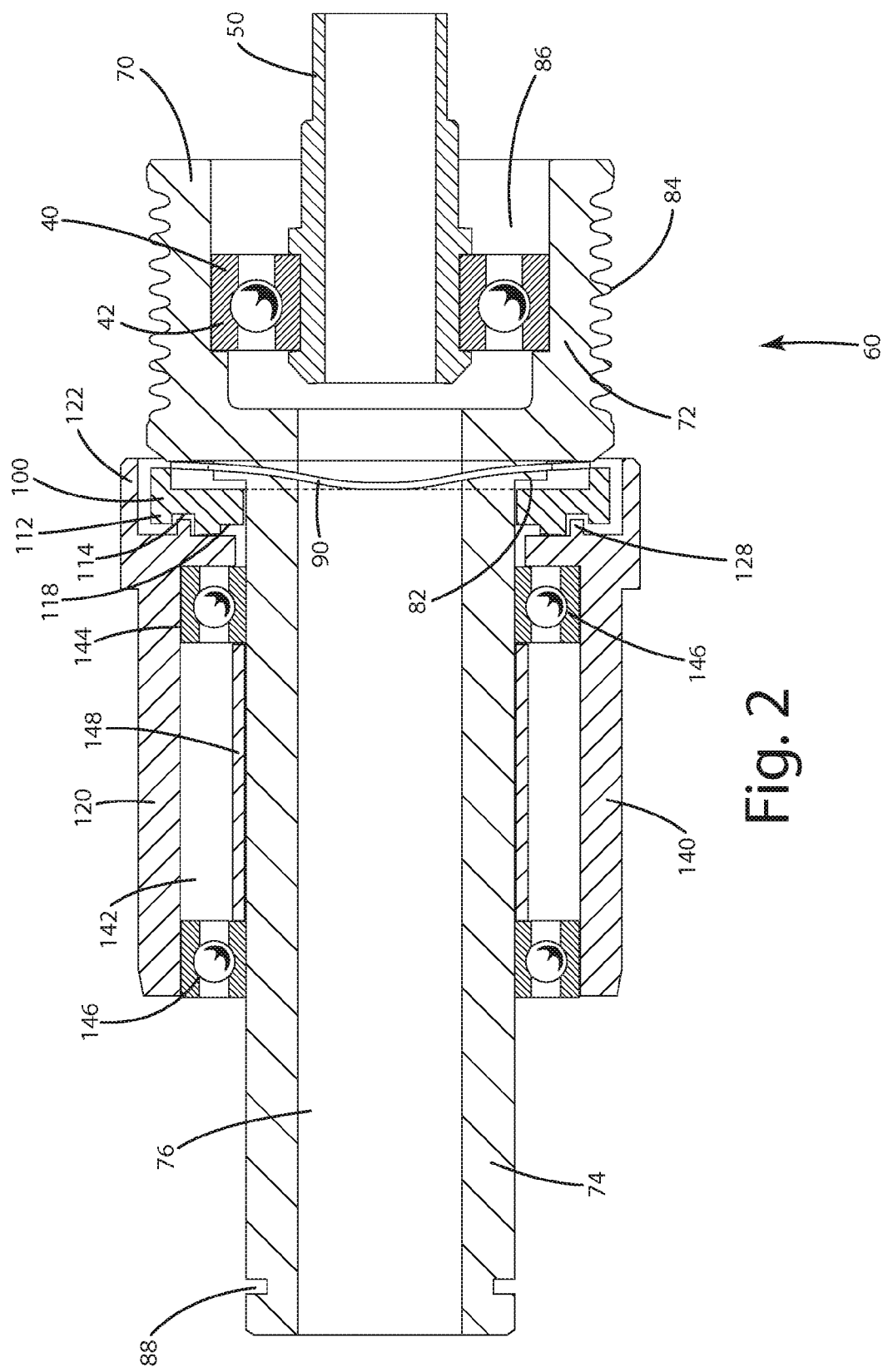
FIG. 2 is an enlarged cross sectional view of the slip assembly.

As illustrated in FIG. 1, the rollers 30 generally include an elongated tube 32 having an outer load surface 34, an inner surface 36 and a roller end 38. An axle shaft 44 such as illustrated hex shaft is configured to engage the support assembly 12 to position the rollers relative to the elongated frames 20. The axle shaft 44 is illustrated as extending as a single continuous member between each elongated frame 20, however, it may instead be formed to only include segments that engage the elongated frames 20, instead of a single member spanning the lateral width of the conveyor system 10. The axle shaft 44 may be made in a variety of other configurations other than the illustrated hex shape and may be made out of a variety of different materials.

The rollers 30 include an axle receiver 50 in which the axle shaft 44 is received. The axle receiver 50 is configured to allow some movement of the axle shaft 44 relative to the elongated tube 32 of the roller 30 to allow easy insertion and removal of the rollers 30 from the conveyor segments, or structural support assembly 12. As illustrated in FIG. 1, at least one main bearing 40 on each end 38 of the roller 30 is provided and allows the elongated tube 32 to easily rotate relative to the axle shaft 44, and the axle receiver 50. The axle shaft 44 may be secured relative to the elongated tube 32 via the illustrated stakes 46 and a shaft spring 48 may allow easy removal and assembly of the rollers 30 in the structural support assembly 12 by biasing the shaft 44 to an engaged position, but allowing when desired, retraction on one side of the roller 30. The main bearings 40 generally engage the inner surface 36 of the roller 30, specifically the elongated tube 32 on one end; however, in the present invention one of the main bearings 40 is configured to fit within a main bearing seat recess 86 on the pulley 72 of the drive shaft 70. Therefore, the axle shaft 44 aligns both the drive shaft 70, pulley 72 and the elongated tube 32 of the roller 30 about the same rotational axis. To prevent off axial movement of the drive shaft 70 relative to the elongated tube 32, at least one additional drive shaft bearing 146 may be provided proximate to one of the main bearings 40 at a roller end 38, specifically within the slip assembly 60 as illustrated in FIG. 1. More specifically, the drive shaft bearing 146, illustrated as a pair in FIG. 1, but may be one or more, provides rotational support between the heat sink interface 120 coupled to the elongated shaft 32 and the drive shaft 70 coupled to the axle shaft 44. As such, the drive shaft bearings 146 also allow the roller tube 32 to rotate relative to the pulley 72 as described below. In the prior art, the roller tube 32 is configured to either rotate completely free on the main bearings 40 with no limited slip or if a pulley 72 is provided at one end, it is prevented from rotating relative to the pulley 72 as the pulley and tube are secured or directly coupled together to prevent rotational movement relative to each other.

As illustrated in FIG. 1, the slip drive assembly 60 fits at least partially within the elongated tube 32. The present invention is uniquely configured to use a metal elongated tube 32 as a heat sink, via the heat sink interface 120 acting as a clutch face and being formed out of metal to transfer the heat from the clutch face to the elongated metal tube 32, such that a low cost clutch material with long life may be provided. More particularly, a low cost non-metallic, preferably low cost plastic or polymer clutches may be used to interface with the heat sink interface 120 in the present invention without overheating and being durable in ambient temperatures during operation in excess of 100 degrees that occur in many facilities. As some facilities may easily hit a 120 plus degrees inside the facility, previously any type of non-metal material used in a clutch system was extremely expensive and had less performance or excessive wear at higher ambient temperatures, such as 100-120° F. As some clutch systems need to slip a substantial majority of the operational time, heat from friction is a particular problem when added to a high ambient temperature. In comparison, the present invention uses the roller, particularly the elongated metal tube 32 as a large heat sink to provide consistent temperature no greater than or within a limited excess of the ambient temperature, even when the slip assembly allows for slip for an extended time period, or even when slip is substantially continuous. The present invention keeps the clutch surface less than 160 degrees Fahrenheit under the temperatures mentioned above, and in most operating conditions may keep the temperature close to the ambient temperature due to the elongated tube acting as a large heart sink.

Figure 3:
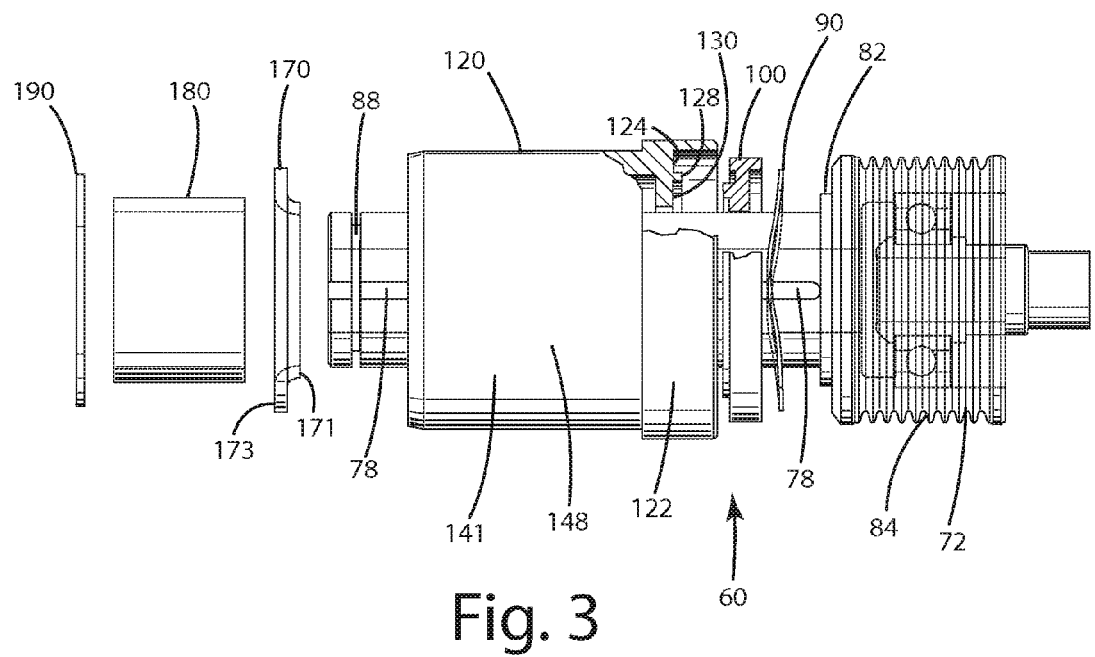
FIG. 3 is an exploded partial cross sectional view of the slip assembly.

As further illustrated in FIG. 3, the slip drive assembly 60 generally includes a drive shaft 70 ending in the pulley 72, a heat sink interface 120, a compliance device, such as the illustrated wave washer 90 and a thrust washer 100, acting as a clutch material. Also provided are generally are a compression spring 180, a shield washer 170 and a retaining ring 190, which retains all of the above components on the drive shaft 70.

The drive shaft 70 generally includes an elongated shaft 74 extending from the pulley 72. An axle passage 76 may extend through both the pulley 72 and the elongated shaft 74. As illustrated in the Figures, an anti-rotation key 78 may be provided on the elongated shaft 74 which interfaces with an anti-rotation key 102 on the thrust washer 100 to ensure that the thrust washer 100 rotates in unison with the pulley 72, and under certain controlled or desired circumstances, not in unison with or relative to the elongated tube 32 and heat sink interface 120. As such, the drive shaft 70, in a slip situation, may rotate relative to the heat sink interface 120, however, in an engaged situation where the load is moving on the rollers 30, the pulley 72 and the drive shaft 70 rotate in unison. The drive shaft 70 may also be in a partially engaged situation causing rotation of the drive shaft to be at least partially in cooperation with the heat sink interface 120, although at a lesser speed than the pulley 72 due to some slip occurring between the thrust washer 100 and heat sink interface 120. In the present invention, the heat sink interface 120 is a metallic material, such as steel, that has excellent heat transfer characteristics, while the drive shaft 70 is a polymer material, such as a glass filled nylon material. Of course, the drive shaft 70 can be formed from a variety of other materials, including metallic materials, however it has been found that polymer materials, such as glass filled nylon material provides an excellent balance of cost and performance.

Figure 4:
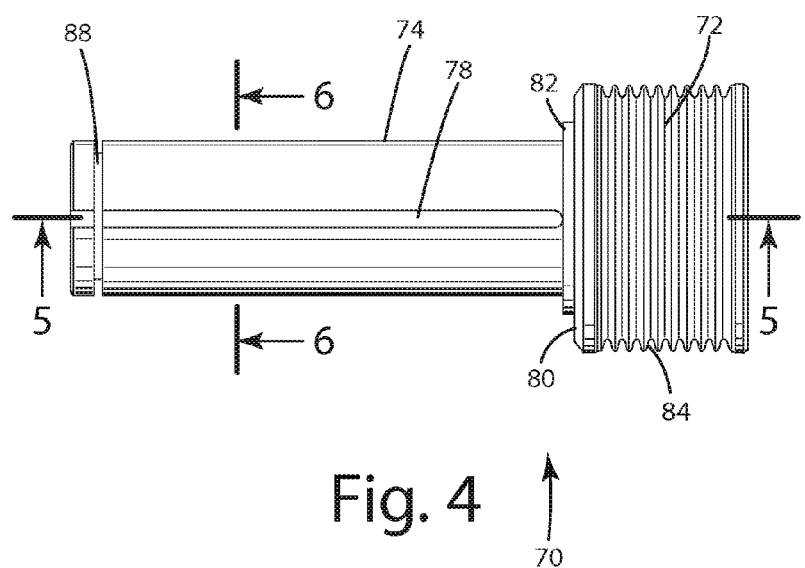
FIG. 4 is a front view of the drive shaft.

As further illustrated in the Figures, the pulley 72 includes a drive surface 84 such as the illustrated micro-V grooves and may be driven by a micro-V groove belt 83. Of course, any other type of drive system such as a V-belt, O-ring or other mechanism for transferring power between rollers 30 may be used with the present invention. The drive shaft 70 further includes a main bearing recess 86 for receiving the main bearing 40 and a wave washer support surface 80. The wave washer support surface 80 works in cooperation with the wave washer 90 to force the thrust washer 100 against the heat sink interface 120. As illustrated in FIGS. 3 and 4, shoulder 82 on the pulley 72 may also align the wave washer 90 during assembly. Of course, other styles and configurations may be used.

The compliance device 90 is illustrated in the Figures and described below as a wave washer 90 having at least three and preferably four support nodes 92 engaging a single surface. As such, typically plus or minus one support node engages the opposing surface. The three or four support nodes 92 engaging each of the opposing surfaces provides a consistent pressure to the thrust washer 100 and a consistent platform for the pulley 72, allowing for tolerance imbalances and rotational movement as well as load imbalances to ensure that the amount of torque is consistent and uniform. The wave washer 90, providing a consistent pressure to the thrust washer 100, eliminates the effect of compliance or tolerance variations between the pulley 72 and the heat sink interface 120 coupled to the elongated tube 32. As such, the wave washer 90 is helpful in allowing the present invention to apply minor amounts of torque in a consistent and uniform fashion, more specifically that the torque, that is consistent between each roller in the system 10. The compliance device may also be springs, a bladder, or an elastomer.

Of course, rollers 30 may be intentionally varied for applied torque in a system, such as certain zones have more force applied to the load in a slip condition than other zones, and the present invention allows for both consistency or controlled variation, such that the applied forward force to a particular load is known and prevents damage to the load and the system, particularly the drive system, from occurring in a cost effective and consistent manner. While more support nodes 92 may be used, on a wave washer 90 such as five or six or even more support nodes, as additional support nodes 92 are added, the wave washer 90 becomes harder to compress and may limit the ability to adjust for tolerance variations and load/unload variations of the roller. The wave washer 90 is configured to be balanced or in approximate balance with the compression spring 180 such that the wave washer 90 is compressed 25-75% during operation, provides sufficient force of the thrust washer 100 against the friction surface 130 on the heat sink interface 120, yet allows further compression to allow for tolerance differences. In the preferred embodiment, it has been found that an approximate 50% crush rate of the wave washer after installation provides a good balance of compliance as well as consistent and uniform light pressure on the friction surface 130 by the thrust washer 100, to provide consistent application of torque to the loads. Tolerance variations may occur not only from the manufacturing and assembly process, but also when the pulley 72 and elongated tube 32 are not rotating in unison, especially when the roller is supporting a passing or stationary load, and the wave washer 90 eliminates most of the effect of these variations, such that the torque application remains consistent. The wave washer 90 in the present invention is formed from spring steel and can be formed in a variety of other configurations and of a variety of other materials.

The thrust washer 100 includes a thrust compliance surface 104 which engages the wave washer 90. The thrust compliance surface 104 generally includes an outer shoulder 106 surrounding the wave washer 90 and enclosing it as much as practical from dirt and contamination, without affecting the friction characteristics. As such, the outer shoulder 106 is configured to be as close as possible to the wave washer support surface 80; however, some gap for tolerances as well as crushing of the wave washer 90 in a controlled manner remains. The outer shoulder 106 and thrust compliance surface 104 generally create a wave washer recess 108 to receive the wave washer 90. The thrust washer 100 also includes an anti-rotation key 102 which engages the anti-rotation key 78 on the elongated shaft 74 of the drive shaft 70. Anti-rotation keys can be a variety of sizes, shapes, and configurations, however, the simple groove and tab as illustrated allows for easy assembly and manufacture.

Figure 8:
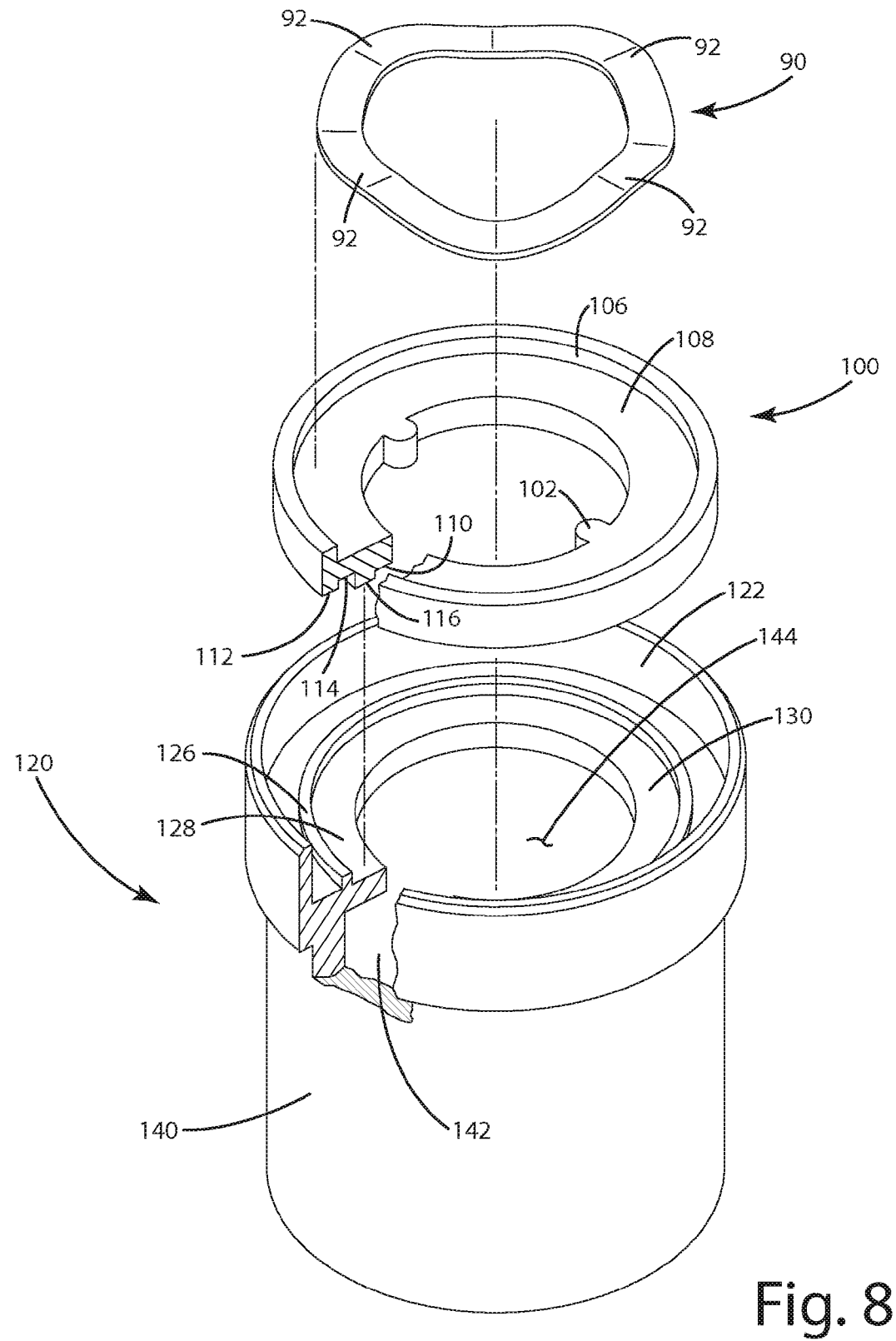
FIG. 8 is an exploded perspective and partial cross sectional view of the heat sink interface thrust washer, and compliance device.

As illustrated in FIGS. 3 and 7-8, the thrust washer 100 includes a slip face 110 opposed to the thrust compliance surface 104. The slip face 110 also includes an outer ridge 112 to help reduce contamination from operation in the facility. Any contamination such as dirt, dust or other grime may change the characteristics of the friction surface. As the facilities in which many conveyor systems are located are subject to a variety of dirt, grime, cardboard dust from boxes as well as other dust in the facility, preventing contamination is important, as dust or other contamination on the clutch surface may change the friction characteristics of a particular roller 30, typically increasing friction and therefore increasing the force a roller applies to a load before slip occurs between the elongated tube 32 and pulley 74. The slip face 110 includes an outer recess 114 which receives the ridge 128 of the contoured clutch surface 126 which in turn is configured to provide additional tortious pathway to limit the ability of dirt and contamination reaching the clutch surface 116 on the thrust washer 100 where it engages the friction surface 130 on the heat sink interface 120. A further inner recess 118 may be provided and the clutch surface 116 may be relatively small without worrying about deformation even if it is made of plastic or polymer material due to the heat sink interface 120 using the metallic contoured clutch surface to transfer heat away from the thrust washer 100, through the outer shoulder and sleeve and eventually to the elongated tube 32 of the roller 30.

In the present invention, for traditional loads, such as packages and beverages, the present invention is configured in the preferred embodiment to use a low friction material as the thrust washer, such as acetal (polyoxmethylene) or a similar material. More specifically, the present invention in the preferred embodiment uses a thrust washer 100 with that is high strength, low friction with excellent wear properties, good dimensional stability, and ease of machining to tight tolerances. While the acetal material may be glass filled, in the present invention, such additional reinforcement is not required as the wave washer 90 as illustrated, provides sufficient consistent support, and both homopolymer acetal and copolymer acetal may be used. As a low friction material acetal has a coefficient of friction (dynamic) of less than 0.5, typically about 0.35 for 20% glass filled acetal, 0.20-0.21 for hompolymer and copolymer acetal and as low as 0.12 for HPV PTFE-filled acetal. Other low friction materials with the above characteristics may also be substituted for acetal.

Figure 9:
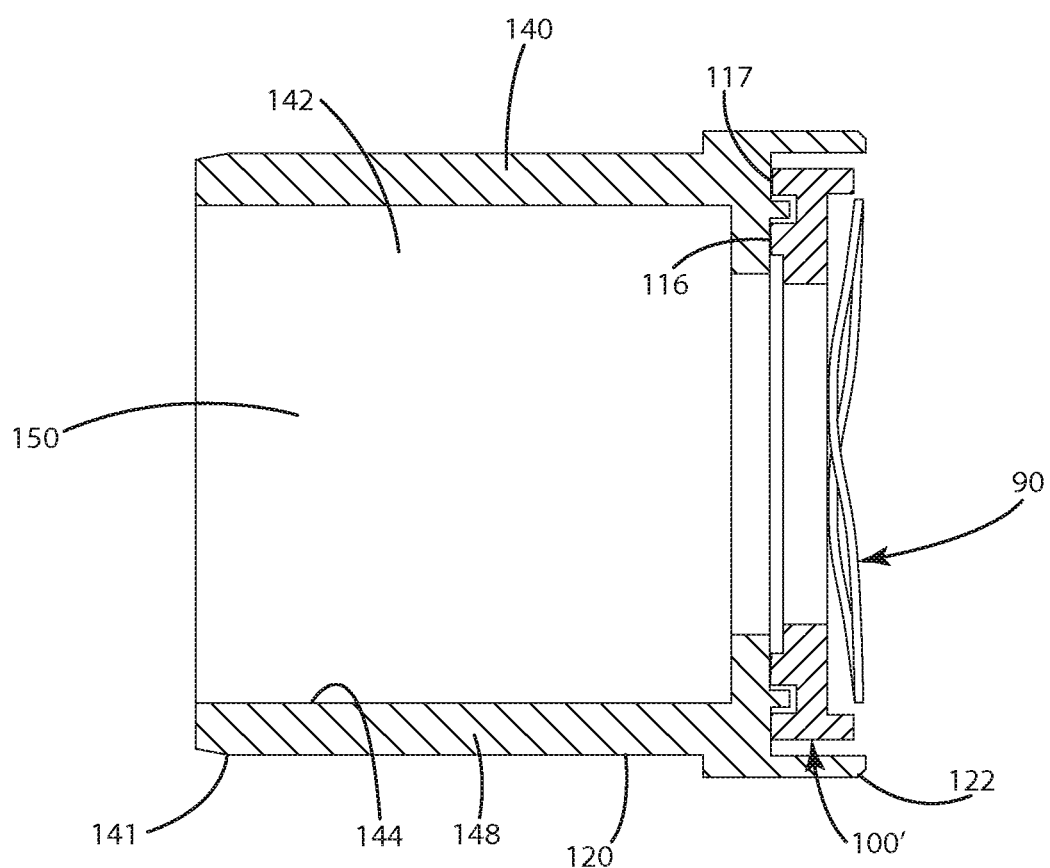
FIG. 9 is a partial cross sectional view of the assembled heat sink interface, thrust washer, and compliance device.

As illustrated in FIG. 9, a secondary clutch surface 117 may be included on the thrust washer 100, providing a double clutch system. As the size of the roller 30 expands to be used in other embodiments such as pallet conveyors, the size of the clutch surface may need to increase. However, as provided in the present invention the clutch surface may be approximately as small as ⅛ of an inch across or even smaller without excessive wear occurring. Of course, the specific size of the clutch surface may vary depending on application and the type of weight of the loads on the rollers 30, and size of the rollers 30.

The heat sink interface 120 is formed of a metallic material such as steel and is configured to transfer heat away from the thrust washer 100 to the roller elongated tube 32 thereby increasing the life expectancy of the slip drive assembly 60. The heat sink interface 120 is configured to have an outer shoulder 122 which creates an outer recess 124 defined by the outer shoulder 122 and the contoured clutch surface 126 to receive the thrust washer 100. As illustrated in the Figures, the wave washer 90 and portions of the drive shaft 70 may also fit within the outer recess 124. The contoured clutch surface 126 includes the ridge 128 and a friction surface 130. The friction surface 130 as well as the clutch surface 126 each may be finished to a particular surface finish to provide the desired amount of rotational torque from the pulley to the elongated tube before slip occurs. However, it is expected that in most circumstances that a fairly polished surface similar to what the surface would look like after operation in a facility for some time period is preferred to prevent changes in the torque characteristics of each roller 30 over time. Extending from the outer shoulder 122 is an elongated sleeve 140 that includes an outer surface 141 configured to engage or be coupled to the elongated tube 32 on the roller 30. The outer surface 141 may be press fit into the elongated tube 32, however, it is expected that in most circumstances other types of bonding, welding or methods of assembly may be used.

As illustrated in FIGS. 1 and 9, the elongated sleeve 140 includes an inner recess 142 which in turn includes a bearing surface 144 in which the drive shaft bearings 146 are placed. To prevent off-axle movement relative to the axis of the axle shaft 44 on the elongated tube 32 by the drive shaft 70, which may in turn create torque variations, the present invention is expected to be used at least two drive shaft bearings 146 as illustrated in the Figures, spaced apart. The drive shaft bearings 146 are spaced at opposite ends of the inner recess 142 to provide maximum spacing on the shaft 70, and as such maximum load abilities. Of course, one larger bearing such as a needle bearing or other bearings may be used; however, for cost efficiency the illustrated drive shaft bearings 146 provide the desired characteristics at a low cost. A sleeve 148 may be placed between the drive shaft bearings 146 to prevent off-axle loads such as the load provided by the shield washer 170 pressing against the bearing from the compression spring 180. A sleeve 148 may include a shaft passage 150 through which the drive shaft 70 extends. The shield washer 170 is configured to provide mechanism for the pulley and slip assembly 60 to be pushed tightly together and includes an outwardly extending portion 173 and a collar 171. More specifically, the retaining ring 190 engaged in the retaining groove 80 is pressed by the compression spring 180 away from the end of the roller elongated tube 32.

An elastomer seal (not illustrated) may be added to the exterior of the drive shaft 70 such as on the pulley 72 and while not touching the roller end or thrust washer or heat sink interface 120 it may just reduce the likelihood of contamination and thereby torque variance over the lifetime of the individual rollers.

As discussed above, the present invention provides a unique and simple clutch or slip assembly within a roller tube that provides a very light rotational torque before slipping and thereby allowing accumulation of loads over long segments of accumulator conveyors.

The invention claimed is:

1. A roller for a roller bed conveyor system and driven by an external drive apparatus, said roller comprising:
    an elongated tube having an axis and having an outer load surface and being configured to rotate about said axis;
    a slip assembly coupled to said elongated tube, said slip assembly comprising:
        a drive shaft having an elongated shaft extending along the axis for rotation by a motor and disposed at least partially in said elongated tube;
        a heat sink interface disposed at least partially in and attached to said elongated tube and disposed radially between said elongated tube and said drive shaft and wherein said heat sink interface and said drive shaft are configured to selectively rotate relative to each other;
        a thrust washer disposed annularly about said elongated shaft and located axially between said drive shaft and said heat sink interface; and
        a compliance device located axially between said thrust washer and said drive shaft for biasing said thrust washer toward said heat sink interface;
    wherein the elongated tube does not include a motor contained therein.

2. The roller of claim 1 wherein said driveshaft includes a pulley and said pulley is located proximate to an end of said elongated shaft outside of said elongated tube for being driven by the external drive apparatus.

3. The roller of claim 1 wherein said driveshaft includes an integral pulley outside of said elongated tube for being driven by the external drive apparatus, and said elongated shaft extends from said pulley.

4. The roller of claim 1 wherein said driveshaft includes an axle cavity and wherein said axle cavity includes a main bearing seat recess configured to receive a main bearing.

5. The roller of claim 4 wherein an axle shaft extends through said elongated tube and said driveshaft and said drive shaft is at least partially supported on said axle shaft by said main bearing.

6. The roller of claim 4 further including a shaft spring engaging said slip assembly and said axle, and wherein said shaft spring biases said axle relative to said slip assembly, and wherein said axle is moveable relative to said slip assembly and said elongated tube along said axis.

7. The roller of claim 1 wherein said elongated shaft of said drive shaft includes a first anti-rotation key and wherein said thrust washer includes a second anti-rotation key and wherein one of said first and second anti-rotation keys are received by the other of said first and second rotation keys to prevent said thrust washer from rotating about said axis relative to said drive shaft.

8. The roller of claim 1 wherein said thrust washer includes a first contoured surface engaging said heat sink interface.

9. The roller of claim 8 wherein said thrust washer includes a compliance surface engaging said compliance device.

10. The roller of claim 9 wherein said compliance surface is flat.

11. The roller of claim 8 wherein said first contoured surface includes a clutch surface configured to engage said heat sink interface.

12. The roller of claim 11 wherein said first contoured surface further includes a second clutch surface.

13. The roller of claim 11 wherein said first contoured surface further includes a clutch surface radially disposed about said axis.

14. The roller of claim 13 wherein said first contoured surface further includes an inner recess between said axis and said clutch surface, an outer ridge and an outer recess between said outer ridge and said clutch surface, wherein said inner recess and said outer recess are axially spaced from said outer ridge.

15. The roller of claim 13 wherein said clutch surface has a greater height from the base of said outer recess than said outer ridge.

16. The roller of claim 1 wherein said compliance device engages said drive shaft and said thrust washer.

17. The roller of claim 1 wherein said compliance device is configured to provide consistent engagement between the thrust washer and said heat sink interface while compensating for manufacturing tolerance variations and tolerance variations due to force applied to said elongated tube.

18. The roller of claim 1 wherein said compliance device is selected from the group consisting of at least one coil spring, an elastomer, a wave washer, and a bladder.

19. The roller of claim 18 wherein said compliance device is a wave washer.

20. The roller of claim 1 wherein said heat sink includes an elongated sleeve, an outer shoulder extending radially outwardly relative to said elongated sleeve, and a radially inward extending portion.

21. The roller of claim 20 wherein said radially inward extending portion includes a contoured clutch surface extending axially therefrom.

22. The roller of claim 21 wherein said contoured clutch surface includes a friction surface and a ridge.

23. The roller of claim 21 wherein said contoured clutch surface includes at least two separate friction surfaces configured to engage a slip face of said thrust washer.

24. The roller of claim 21 wherein said thrust washer includes an outer ridge, an outer recess, a first clutch surface, and an inner recess, wherein said outer ridge is axially spaced from said outer recess and said inner recess.

25. The roller of claim 24 wherein said thrust washer includes a second clutch surface.

26. The roller of claim 24 wherein said outer ridge of said thrust washer fits within said outer recess of said contoured clutch surface of said heat sink interface, and wherein said ridge on said contoured clutch surface fits within said outer recess on said thrust washer.

27. The roller of claim 26 wherein said outer ridge of said thrust washer is spaced apart from said outer recess of said contoured clutch surface of said heat sink interface, and wherein said ridge on said contoured clutch surface is spaced apart from said outer recess on said thrust washer.

28. The roller of claim 21 wherein said outer shoulder and said radially inward extending portion define a cavity for receiving said thrust washer.

29. The roller of claim 1 further including a retaining ring secured to said elongated shaft proximate to an end and a spring between said heat sink and said retaining ring.

30. The roller of claim 29 further including a shield washer and wherein said heat sink interface includes at least one driveshaft bearing configured to allow said driveshaft to rotate relative to said heat sink and wherein said spring is located between said retaining ring and said shield washer and wherein said spring is configured to apply force to said driveshaft bearing through said shield washer.

31. The roller of claim 30 wherein said shield washer includes outwardly extending portion, and a collar extending therefrom along the inner edge of the shield washer.

32. The roller of claim 31 wherein each of said at least one driveshaft bearings has an inner member configured to engage said driveshaft and an outer member configured to engage said heat sink interface, and wherein said collar is configured to engage one of said at least one driveshaft bearings and only apply pressure to said inner member of said driveshaft bearing.

33. The roller of claim 30 wherein said spring and said compliance device apply substantially equal opposing forces.

34. The roller of claim 1 wherein said thrust washer is formed from acetyl.

35. The roller of claim 1 wherein the friction coefficient between said thrust washer and said heat sink interface is 0.05 to 0.4.

36. The roller of claim 35 wherein said friction coefficient is between 0.1 and 0.3.

37. The roller of claim 35 wherein said friction coefficient is 0.2.

* * * * *